July 30, 1946.　　　　F. C. SILVA　　　　2,404,990
FRUIT HALVING AND PITTING
Filed Aug. 26, 1944
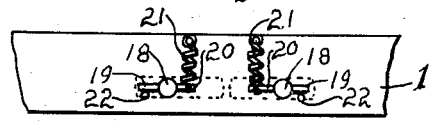
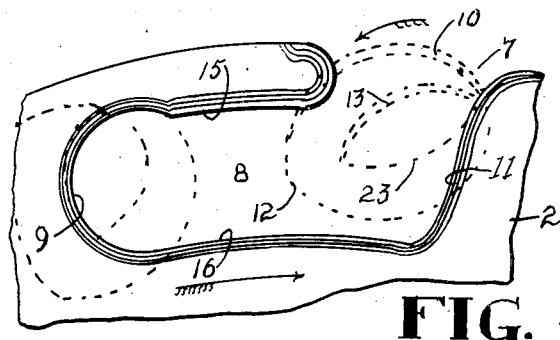
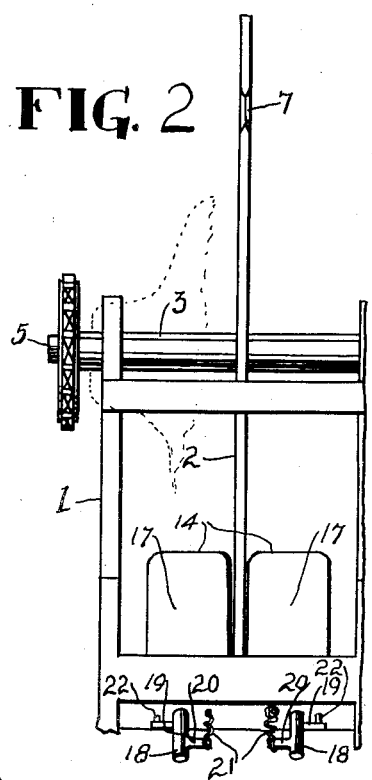
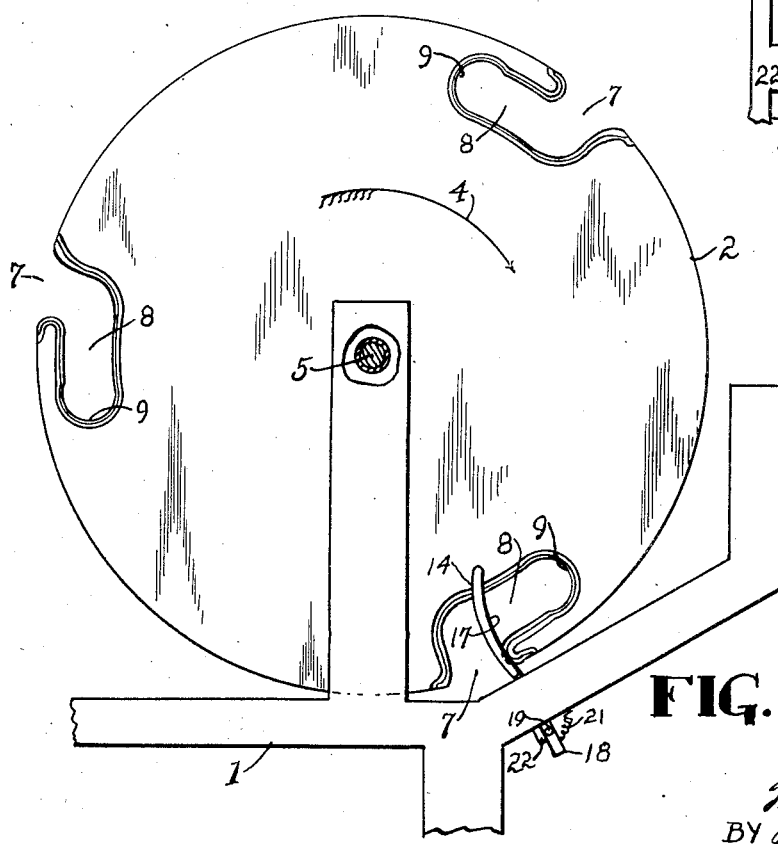
INVENTOR
Frank C. Silva
BY John A. Naismith
ATTY Patented July 30, 1946

2,404,990

UNITED STATES PATENT OFFICE 2,404,990

FRUIT HALVING AND PITTING

Frank C. Silva, San Jose, Calif.

Application August 26, 1944, Serial No. 551,384

7 Claims. (Cl. 146—28)

The present invention relates to a device for cutting into halves and removing the pits from soft fruits such as apricots.

It has heretofore been customary to cut and remove the pits from such fruit as apricots entirely by hand or, in somewhat isolated cases, by moving the fruit against a stationary knife. But the output of a single operator is very limited in either case, and it is the object of the present invention to provide a movable knife constructed and arranged to receive the fruit to be cut and automatically halve the same and remove the stone therefrom.

It is also an object of the invention to provide a device of the character indicated that can be assembled in batteries of any desired number and operated at a speed that will enable an operator to properly feed fruit to each element of the battery without undue exertion.

Finally it is an object of my invention to provide a device of the character indicated that will be continuous in operation, economical to manufacture, simple in form and construction, strong, durable, and highly efficient in its practical application.

In the drawing:

Figure 1 is a side elevation of a device embodying my invention, partly in section and partly broken away.

Figure 2 is a front elevation of the same with parts broken away.

Figure 3 is a face elevation of the mountings for the fruit stops.

Figure 4 is an enlarged detail side elevation of a portion of the circular blade showing the preferred formation of the fruit cutting edge.

To illustrate my invention I show at 1 a portion of the supporting frame upon which the circular blade 2 is mounted as at 3 to rotate in the direction indicated by arrow 4. The blade 2 is fixedly mounted on a shaft 5 driven by a motor not shown.

At spaced intervals in the peripheral edge of the blade 2 are cut inwardly extending passages as 7. The passages 7 extend inwardly but a little way as shown and then are directed circumferentially, as at 8, preferably in concentric relation with the center of the blade. The closed end of the slot or passage is preferably arcuate in form and a little larger than the width of the slot leading thereto as at 9.

The width of the passage 7 is slightly greater than the length of the stone to pass therethrough and is substantially the same as that of end 9, while the connecting portion 8 may be a little less in width than the end 9. The reason for this is that in stone fruits such as the apricot the fruit is cut on the dorsal-ventral plane in order that the stone may be removed properly. This plane is clearly indicated in the apricot by a shallow groove extending lengthwise of the apricot directly, as a rule, over the ventral edge. And extending from end to end of the stone and on either side of the ventral suture or edge is a fin where the ventral vascular bundles are located.

In placing the apricot on the knife 2 the present technique is to hold the apricot with the groove 10 upwardly directed and force the base of the apricot down on the cutting edge 11, at the same time turning the point of the apricot inwardly to the position 12, in which position the fins 13 on the stone are directed forwardly so they will engage the edge 9.

The blade 2 is rotated slowly, preferably about ten R. P. M. and the operator has ample time to force an apricot into the position described, that being the extent of the manual manipulation of the apricot. To complete the operation I provide stop means as shown at 14 in a position to arrest the further movement of the apricot and force it between the cutting edges 15 and 16 to the end 9 where one of the fins 13 engages the edge 9 causing it to be forced between the stops 14 while the pulp of the apricot is completely cut into two parts and fall down without passing between the stops.

There are two identical stop members, one positioned on each side of the blade 2 and close thereto. Each stop member 14 comprises a seat portion 17 against which the apricot is pushed and mounted on a stem 18 rotatably mounted in the frame 1 and passing therethrough. The stem 18 is fitted with laterally extending pins as 19 and 20, the pin 20 being connected to the frame 1 by a spring 21 to urge the stop member to rotate in one direction while the pin 19 seats against a pin 22 in frame 1 to hold the stop member 14 normally in a radial plane at right angles to the plane of the blade 2.

When the operator thrusts an apricot through the slot at 7 and leaves it there the continuous rotation of the blade 2 carries it around until it contacts the stop members 14. When this occurs the apricot is forced by the stop members 14 to move along until the edge 9 engages one of the fins 13 as described. The continuous rotation of the blade 2 presses the stone 23 between the stop members 14, causing each half to rotate on its stem 18 against the urge of springs 21 and opening sufficiently to permit the stone 23 to pass between them. The two halves of the cut apricot fall away from the stop members 14 by gravity, and the stone is carried on to drop away after it passes the stop.

Clearly if several of the discs 2 are spaced along the same shaft and rotated slowly as described, a single operator can service them all. In a highly efficient device the disc 2 should be substantially one-eighth of an inch thick and only the edges of the apricot receiving slots should be sharpened. It would fill no useful purpose to sharpen the edge of the disc or blade between the passages 7.

Having thus described my invention, what I claim as new and desire to secure by Letters Patent is:

1. In a fruit cutting device, a disc having one or more slots provided with cutting edges directed inwardly from its periphery and then laterally in substantially parallel relation therewith, and having a substantially uniform width throughout.

2. In a fruit cutting device, a round disc having one or more slots provided with cutting edges directed radially inwardly from its peripheral edge and then laterally in substantially parallel relation therewith and having a substantially uniform width throughout except in its closed end which is slightly enlarged.

3. In a fruit cutting device, a round rotating disc having one or more slots provided with cutting edges directed radially inwardly from its peripheral edge and then laterally in substantially parallel relation therewith and in the direction opposite to its direction of rotation and having a substantially uniform width throughout.

4. A device of the character described comprising, in combination, a supporting frame, a disc having one or more slots provided with cutting edges formed therein and directed inwardly from its periphery and then laterally in substantially parallel relation therewith mounted thereon to rotate in a vertical plane, and stop means associated with the disc and frame and disposed on either side of the disc to lie in the path of travel of the fruit in the slots.

5. In a fruit cutting device, a circular rotating disc having one or more slots provided with cutting edges directed radially inwardly from its peripheral edge and then laterally in substantially parallel relation with said edge in the direction opposite to its direction of rotation and terminating in a pocket of slightly greater dimensions than the last named portion of the slot.

6. A fruit cutting and pitting device comprising, a supporting frame, a fruit cutting disc mounted to rotate thereon, said disc having one or more slots provided with cutting edges directed inwardly from its peripheral edge and then laterally in the direction opposite to its direction of rotation to hold fruit and move the same over a given path of travel, stop means mounted on the frame on either side of the disc to lie in the path of travel of the fruit in the slots, each stop means comprising a member having a stem passing through the frame and provided with laterally directed pins on its opposite sides, a stop pin for one of said pins, and resilient means connecting the other pin with the frame to normally hold the other pin against the stop pin and maintain the member at right angles to the plane of the disc.

7. A fruit cutting and pitting device comprising, a rotating disc having one or more slots provided with cutting edges directed inwardly from its peripheral edge and then laterally in substantially parallel relation therewith to hold and cut a fruit and move the fruit through a given path of travel, and stop means associated with the disc and disposed on either side of the disc to lie in the path of travel of the fruit thereon and to remove the fruit therefrom and comprising a pair of duplicate members, each member having a stem radially directed relative to the disc and rotatable on its own longitudinal axis, and means operative to resiliently support the member in a radial plane at right angles to the disc.

FRANK C. SILVA.